(12) United States Patent
Sakaguchi et al.

(10) Patent No.: US 10,312,492 B2
(45) Date of Patent: Jun. 4, 2019

(54) SERIES-COUPLING COMPONENT FOR BATTERY PACK AND BATTERY PACK

(71) Applicant: FDK CORPORATION, Tokyo (JP)

(72) Inventors: Makoto Sakaguchi, Tokyo (JP); Takashi Hirabayashi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 122 days.

(21) Appl. No.: 15/556,296

(22) PCT Filed: Feb. 23, 2016

(86) PCT No.: PCT/JP2016/055218
§ 371 (c)(1),
(2) Date: Sep. 7, 2017

(87) PCT Pub. No.: WO2016/143503
PCT Pub. Date: Sep. 15, 2016

(65) Prior Publication Data
US 2018/0047966 A1 Feb. 15, 2018

(30) Foreign Application Priority Data
Mar. 9, 2015 (JP) .................................. 2015-045949

(51) Int. Cl.
*H01M 2/20* (2006.01)
*H01M 2/10* (2006.01)
*H01M 2/34* (2006.01)

(52) U.S. Cl.
CPC ............ *H01M 2/202* (2013.01); *H01M 2/10* (2013.01); *H01M 2/1016* (2013.01); *H01M 2/20* (2013.01); *H01M 2/34* (2013.01)

(58) Field of Classification Search
None
See application file for complete search history.

(56) References Cited

U.S. PATENT DOCUMENTS

2009/0004558 A1 1/2009 Miyazaki et al.
2010/0216011 A1 8/2010 Yoo et al.
(Continued)

FOREIGN PATENT DOCUMENTS

JP S63-105460 A 5/1988
JP H09-63553 A 3/1997
(Continued)

OTHER PUBLICATIONS

International Search Report (ISR) for Application No. PCT/JP2016/055218 dated May 24, 2016.
(Continued)

*Primary Examiner* — Ula C Ruddock
*Assistant Examiner* — Tony S Chuo
(74) *Attorney, Agent, or Firm* — Isshiki international Law Office; Joseph P. Farrar, Esq.

(57) ABSTRACT

A series-coupling component for a battery pack includes a circular plate-shaped bulkhead portion, a cylinder portion taking the bulkhead portion as a top surface and opening downward, an upper end side of the unit battery being inserted into the cylinder portion, and a wall surface portion erected upwardly along a peripheral edge of the bulkhead portion to hold a lower end side of the unit battery, separated by a cutout portion from an upper end of a cylindrical side surface up to a top surface of the bulkhead portion at a part of the cylindrical side surface that opens at the upper side taking the bulkhead portion as a bottom, the bulkhead portion has a hole that communicates in an up and down direction and a groove that has a rectangular cross-section on a top surface and opens at peripheral edges of the hole and the bulkhead portion.

6 Claims, 20 Drawing Sheets

(56) References Cited

U.S. PATENT DOCUMENTS

2011/0311858 A1  12/2011  Lim
2012/0282505 A1  11/2012  Flannery

FOREIGN PATENT DOCUMENTS

| JP | 2000357502 A | 12/2000 |
| --- | --- | --- |
| JP | 2001-345091 A | 12/2001 |
| JP | 2006-134599 A | 5/2006 |
| JP | 2006-318676 A | 11/2006 |
| JP | 2009-009852 A | 1/2009 |

OTHER PUBLICATIONS

Translation of the ISR for Application No. PCT/JP2016/055218 dated May 24, 2016.
Written Opinion of the International Search Authority for Application No. PCT/JP2016/055218 dated May 24, 2016.
The Extended European Search Report for Application No. 16761475.9 dated Jul. 3, 2018.

SERIES-COUPLING COMPONENT FOR BATTERY PACK AND BATTERY PACK

CROSS-REFERENCE TO RELATED APPLICATIONS

The present application is a national phase entry under 35 U.S.C. § 371 of International Application No. PCT/JP2016/055218, filed Feb. 23, 2016, which claims priority from Japanese Application No. 2015-045949, filed Mar. 9, 2015, the entire disclosures of which are hereby incorporated by reference herein.

TECHNICAL FIELD

The present invention relates to a series-coupling component at a battery pack. Specifically, the present invention relates to a series-coupling component used when a plurality of cylindrical batteries are coaxially disposed to mutually couple the cylindrical batteries in series using a tab. The present invention also relates to a battery pack constituted using this series-coupling component.

BACKGROUND ART

There is a battery pack that couples a plurality of unit batteries, taking a cylindrical battery as a unit battery to integrate this plurality of unit batteries in a coupling state using, for example, a heat shrinkable tube. Then, in the battery pack, the unit batteries are often mutually coupled in series to obtain high output voltage. FIG. 1 exemplifies a location and a coupling state of the cylindrical batteries that constitutes the battery pack. FIG. 1 illustrates an example where two cylindrical batteries (10*u*, 10*d*) that will be a main body (hereinafter referred to as a battery pack main body) 1 of the battery pack are coaxially coupled in series. In the following, a direction of an axis 100 of the cylindrical batteries (10*u*, 10*d*) is an up and down direction. Up and down respective directions are specified as convex positive electrode terminals 11 are formed on upper end surfaces of these cylindrical batteries (10*u*, 10*d*). In the battery pack main body 1 illustrated in FIG. 1, the positive electrode terminal 11 of the cylindrical battery 10*d* is coupled to a negative electrode terminal 12 of the cylindrical battery 10*u* via a tab 20 formed of a metal plate. The tab 20 is mounted on the positive electrode terminal 11 of the cylindrical battery 10*d* and the negative electrode terminal 12 of the cylindrical battery 10*u* by welding (for example, spot welding). Thus, the cylindrical batteries (10*u*, 10*d*) are coupled with smaller electrical resistance. The welding also ensures a mounting strength between the cylindrical batteries (10*u*, 10*d*) and the tab 20 to also prevent electrical contact from being unstable, for example, by vibration. Then, the battery pack is configured to fix two cylindrical batteries (the two cylindrical batteries 10*u*, 10*d* in the example illustrated in FIG. 1) coupled in series in such coaxially disposed state by the heat shrinkable tube to maintain an outer shape, and to mount, for example, a terminal plate and a lead wire for supplying electric power to an external device on the positive electrode terminal 11 of the cylindrical battery 10*u* and the negative electrode terminal 12 of the cylindrical battery 10*d* that are coaxially disposed.

FIGS. 2A to 2C are views illustrating an exemplary assembling procedure of the battery pack main body 1 illustrated in FIG. 1. First, as illustrated in FIG. 2A, a strip-shaped metal plate 120 is bridged across the positive electrode terminal 11 of one cylindrical battery 10*d* and the negative electrode terminal 12 of another cylindrical battery 10*u* of the two cylindrical batteries (10*u*, 10*d*) that will be coupled in series. In this state, the metal plate 120 is mounted on the terminals (12, 11) of the respective cylindrical batteries (10*u*, 10*d*) by a method such as spot welding. Next, as illustrated in FIG. 2B, the metal plate 120 is folded to be the tab 20 formed by folding the metal plate 120 in two as illustrated in FIG. 2C, thus coaxially disposing the two cylindrical batteries (10*u*, 10*d*). Following Patent documents 1 and 2 disclose a technique that couples a plurality of cylindrical batteries in series by welding a metallic dish component to the cylindrical batteries without a tab.

CITATION LIST

Patent Documents

[Patent document 1] Japanese Unexamined Patent Application Publication No. 63-105460
[Patent document 2] Japanese Unexamined Patent Application Publication No. 2001-345091

SUMMARY OF INVENTION

Technical Problem

As described above, in order to couple the cylindrical batteries in series in the battery pack, the tab formed of the metal plate has been used, or the metallic dish component described above in Patent documents 1 and 2 has been used. However, when the tab is used, the outer shape of the battery pack is maintained by binding force of the flexible heat shrinkable tube. Therefore, the folded tab is bended again in a direction restoring into a strip shape due to a slight force from outside. Thus, the outer shape as the battery pack easily deforms. Further, when the tab is mounted on a terminal of one cylindrical battery, it is also necessary to accurately mount the strip-shaped metal plate, which will be the tab, in a state guided in a radial direction of this battery.

In a battery pack or the like taking a secondary battery as the unit battery, an external diode or the like is sometimes coupled as a safety circuit. FIG. 3 illustrates a procedure that mounts a diode 30 as the safety circuit on the battery pack main body 1. In order to mount the safety circuit 30 on the battery pack main body 1, first, as illustrated in FIG. 3A, the tab 20 is mounted so as to project to the outside of the cylindrical batteries (10*a*, 10*d*). At one (here, the lower cylindrical battery 10*d*) of the two cylindrical batteries (10*u*, 10*d*) coupled in series, a terminal plate 22 formed of a metal plate is mounted on an electrode terminal (here, the negative electrode terminal 12) on which the tab 20 is not mounted, so as to project to the outside of the battery.

Then, as illustrated in FIG. 3B, the tab 20 has a distal end part 121 that projects outward. The distal end part 121 is folded so as to open in the up and down direction, thus laying this distal end part 121 along side surfaces of the upper and lower cylindrical batteries (10*u*, 10*d*). The terminal plate 22 has a part 123 that projects outward. The part 123 is folded along the side surface of the lower cylindrical battery 10*d*. Then, at the tab 20 and the terminal plate 22, distal ends of lead terminals 31 of the diode 30 are coupled to the parts (21*d*, 23) folded along the lower battery 10*d* using solder 32. When the diode 30 is mounted on the upper cylindrical battery 10*u*, it is only necessary to mount a terminal plate on a terminal (here, the positive electrode terminal 11) at a side on which the tab 20 is not mounted at the upper cylindrical battery 10*u*, to bend a distal end of this terminal plate downward along the side surface of the upper cylindrical battery 10u, and to couple a diode between this bended part and an upwardly-folded part 21u of the tab 20.

However, in the battery pack as illustrated in FIG. 3, when the safety circuit 30 is mounted on the battery pack main body 1, the folded tab 20 and the terminal plate 22 possibly damage an insulating exterior body of the cylindrical batteries (10u, 10d) themselves. Heat when the lead terminals 31 of the safety circuit 30 are soldered to the tab 20 and the terminal plate 22 possibly opens a hole in the exterior body. Since a battery can doubles as one electrode, if there is the hole in the exterior body, the tab 20 and the terminal plate 22 possibly contact a surface of the battery can to cause external short circuit at the cylindrical batteries (10u, 10d).

In the battery pack described in the above-described Patent documents 1 and 2, the cylindrical batteries are coupled in series using an integrated dish coupling component, thus facilitating the maintenance of the outer shape of the battery pack compared with coupling by the tab. However, due to the use of the integrated coupling component, there is a problem that a welding position is easily peeled by high impact. Specifically, when the upper and lower cylindrical batteries coaxially disposed are electrically coupled using the dish coupling component, a bottom of the dish is welded to a terminal at an upper end surface side of the lower cylindrical battery, and an edge of the dish is welded to a surface at a battery can side of the upper battery. That is, in the case of the tab, although the tab is bended by impact and thus easily changing the outer shape of the battery pack, the electrically coupling itself is maintained. In the battery pack using the integrated dish coupling component, the coupling component cannot be deformed by an external force, so that the welding part is peeled.

At the cylindrical battery, one electrode terminal doubles as a sealing body of the battery can, and the sealing body having a circular plate shape is assembled to an opening end of the cylindrical battery can via an insulator. That is, another electrode is disposed on an outer periphery of the sealing body. Therefore, if the dish coupling component is used, the bottom of the dish contacts both of the one electrode terminal that doubles as the sealing body and the edge of the electrode can at the peripheral area of the one electrode terminal, thus possibly causing the external short circuit. In order to surely prevent the external short circuit, it is necessary to additionally dispose the insulator at the peripheral area of the sealing body. Thus, a component cost according to this insulator and a cost according to a process for disposing the insulator are added to make low-price provision of the battery pack difficult. The dish coupling component formed of the metal plate is manufactured through a complicated press process, thus increasing a production cost of the coupling component itself.

Then, one purpose of the present invention is, in a battery pack constituted having a plurality of unit batteries, to employ a reliable coupling method using a tab and accurately coaxially dispose the plurality of unit batteries to provide a series-coupling component for a battery pack that can surely maintain this disposing state, and to provide a low-price and reliable battery pack using this series-coupling component.

Solution to Problem

The present invention to achieve the above-described object provides a series-coupling component for a battery pack, in a battery pack taking a cylindrical battery as a unit battery, the cylindrical battery including one convex electrode terminal at an upper end surface and another electrode terminal at a lower end surface, the coupling component being for holding two of the unit batteries coupled in series via a tab formed by folding a strip-shaped metal plate in a state where the two of the unit batteries are coaxially disposed, the coupling component being constituted of an integrated molded article made of resin, the coupling component including:
a circular plate-shaped bulkhead portion;
a cylinder portion taking the bulkhead portion as a top surface and opening downward, an upper end side of the unit battery being inserted into the cylinder portion; and
a wall surface portion erected upwardly along a peripheral edge of the bulkhead portion to hold a lower end side of the unit battery, the wall surface portion being separated by a cutout portion from an upper end of a cylindrical side surface up to a top surface of the bulkhead portion at a part of the cylindrical side surface that opens at the upper side taking the bulkhead portion as a bottom, the bulkhead portion including a hole that communicates in an up and down direction at a center, and a groove having a rectangular cross-section on a top surface, the convex electrode terminal being inserted into the hole, the tab being housed in the groove, the groove extending in a radial direction of the circular plate-shaped bulkhead portion to open at peripheral edges of the hole and the bulkhead portion, the cutout portion being formed in a region that opens the groove at the peripheral edge of the bulkhead portion.

Further, the present invention may be a series-coupling component for a battery pack in which a width of the cutout portion in a circumferential direction of the bulkhead portion is wider than a width of the groove, and may be a series-coupling component for a battery pack in which the groove crosses the bulkhead portion in a diameter direction to open at both ends of the diameter. The present invention may be a series-coupling component for a battery pack in which the cylinder portion has an inner diameter smaller than an outer periphery of the unit battery, and the upper end side of the unit battery is pressed into an inside of the cylinder portion.

The present invention also covers a battery pack integrally formed in a manner that a plurality of unit batteries coupled one another is covered with a heat shrinkable tube. The present invention according to such a battery pack is a battery pack in which the unit battery is a cylindrical battery including one convex electrode terminal at an upper end surface and another electrode terminal at a lower end surface, the plurality of unit batteries includes two unit batteries coaxially disposed in an up and down direction via the series-coupling component according to any one the above and coupled in series via a tab, in the two unit batteries, the lower unit battery has an upper end side inserted into the cylinder portion of the series-coupling component, the convex electrode terminal is inserted into the hole, and the upper unit battery has a lower end side held by the wall surface portion, the tab formed by folding a strip-shaped metal plate is disposed along the groove, and the tab has a lower surface mounted on an upper surface of the convex electrode terminal exposed at the upper side via the hole, and an upper surface mounted on an electrode terminal on a lower end surface of the upper unit battery.

Further, the present invention may be a battery pack in which the unit battery includes a battery can that doubles as a current collector of one electrode, the tab projects outwardly from the peripheral edge of the bulkhead portion, the projecting region bending along a side surface of the cylinder portion, a safety circuit is coupled to between both positive and negative electrodes of the unit battery where the tab is mounted on an electrode terminal of an electrode different from an electrode of the battery can, among the two unit batteries, one lead terminal guided from the safety circuit is soldered to the projecting region of the tab, and the safety circuit and the plurality of unit batteries are covered with the heat shrinkable tube.

Advantageous Effects of Invention

According to the series-coupling component for the battery pack according to the present invention, when a battery pack is constituted using a plurality of unit batteries, a reliable coupling method using a tab can be employed, and the plurality of unit batteries can be accurately coaxially disposed. This disposing state is less likely to be deformed by the external force. Then, the battery pack using this series-coupling component is low-price and reliable.

DESCRIPTION OF EMBODIMENTS

Cross-Reference to Related Applications

Figure 1:
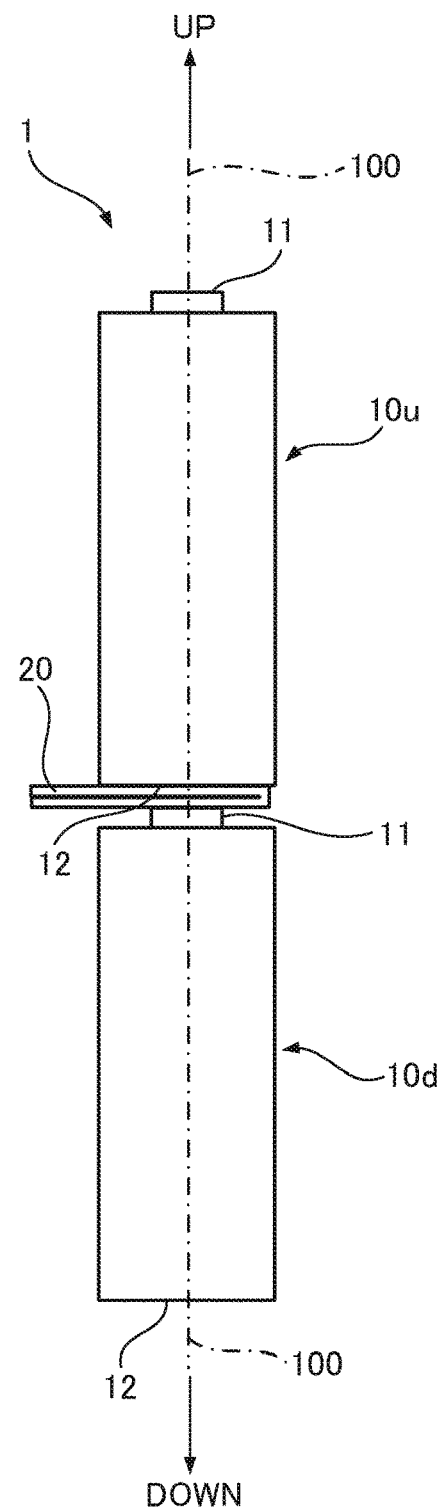
FIG. 1 is a view illustrating a series-coupling state of two unit batteries at a battery pack.
Figure 2A:
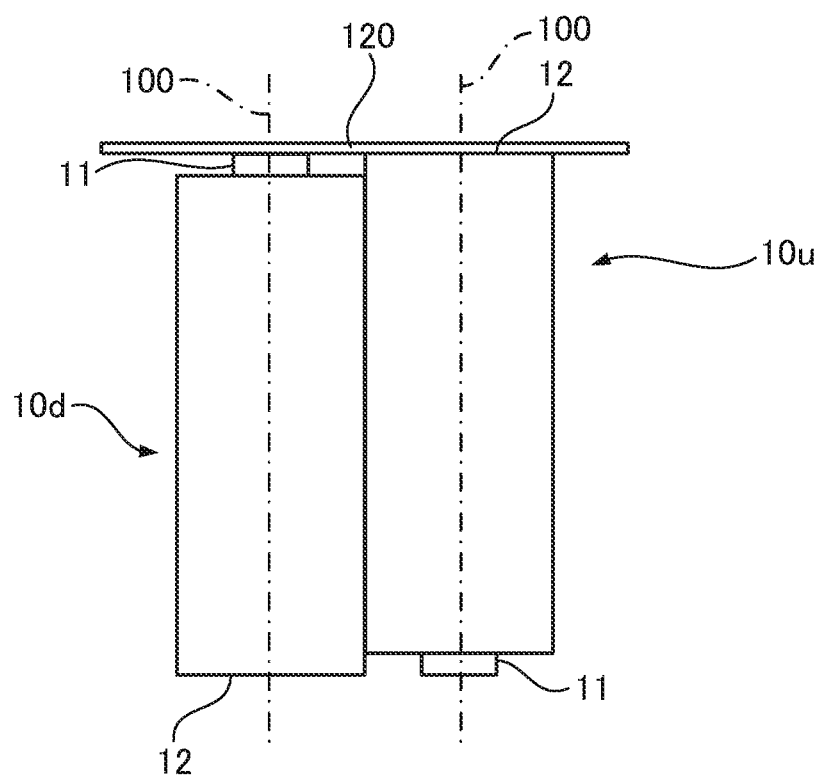
FIG. 2A is a view illustrating one state in a procedure that couples the two unit batteries in series in the battery pack.
Figure 2B:
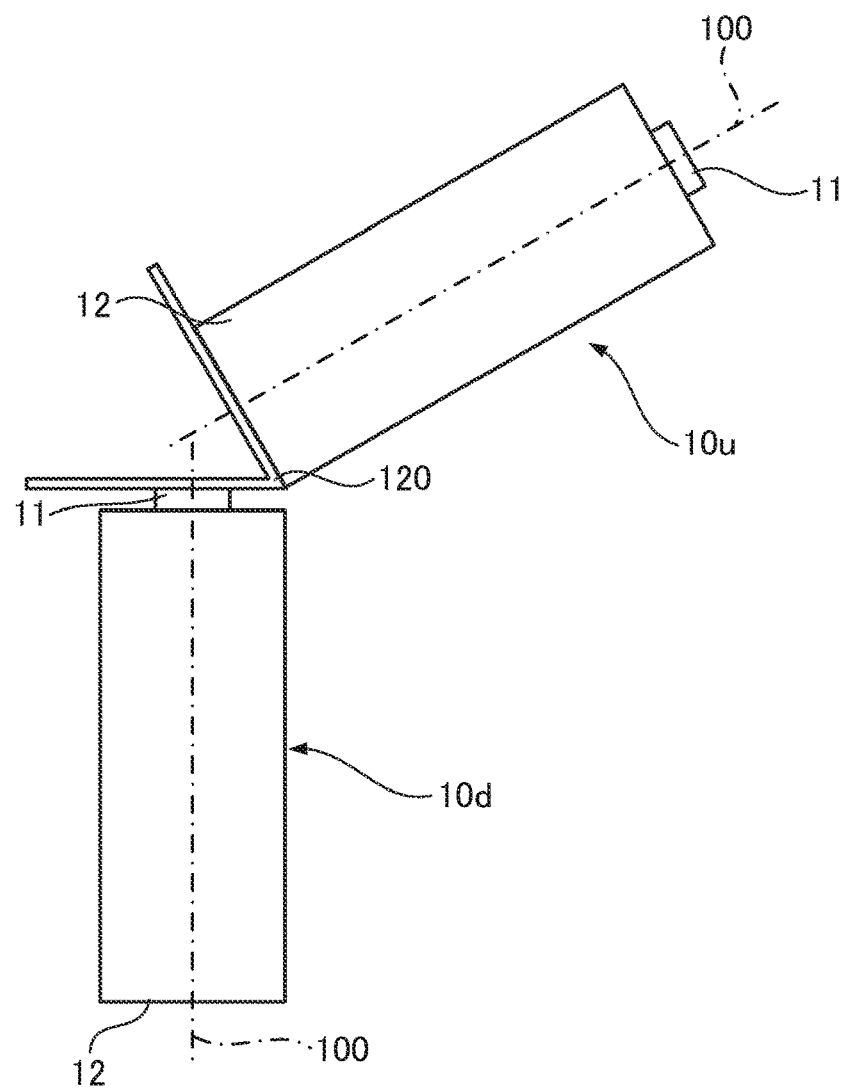
FIG. 2B is a view illustrating one state in the procedure that couples the two unit batteries in series in the battery pack.
Figure 2C:
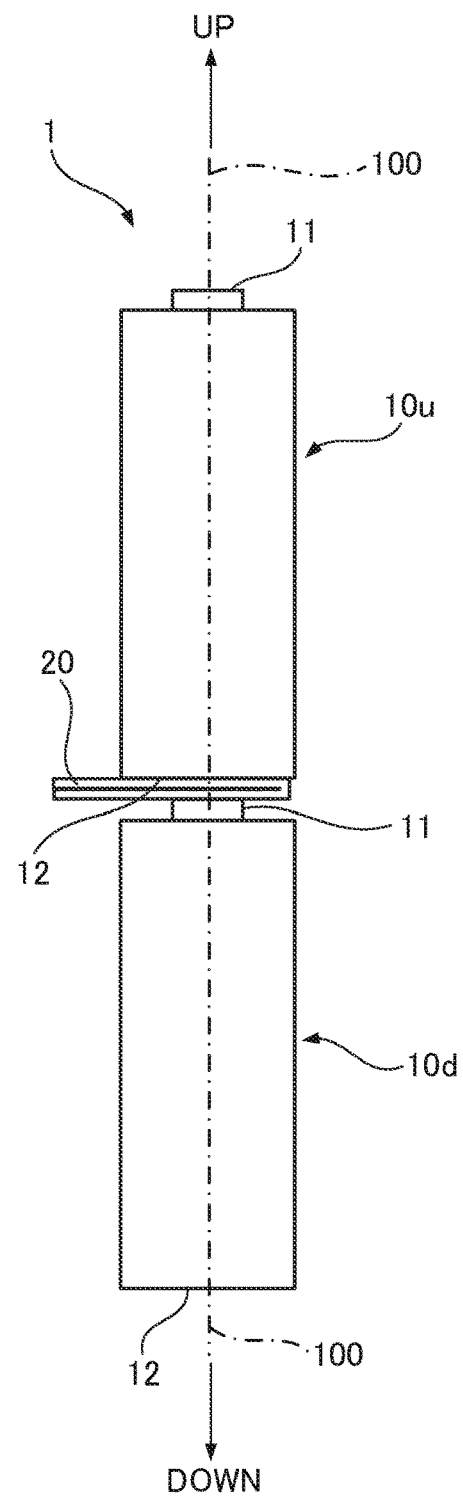
FIG. 2C is a view illustrating one state in the procedure that couples the two unit batteries in series in the battery pack.

The present application claims priority upon Japanese Patent Application No. 2015-45949 filed on Mar. 9, 2015, which is herein incorporated by reference.

The following describes embodiments of the present invention with reference to the attached drawings. Like reference numerals designate corresponding or identical elements in the drawings used for the following description, and therefore such elements may not be further elaborated. While a reference numeral is assigned to a part in a drawing, if unnecessary, the reference numeral may not be assigned to the corresponding part in another drawing.

First Embodiment

Structure of Series-Coupling Component

Figure 4A:
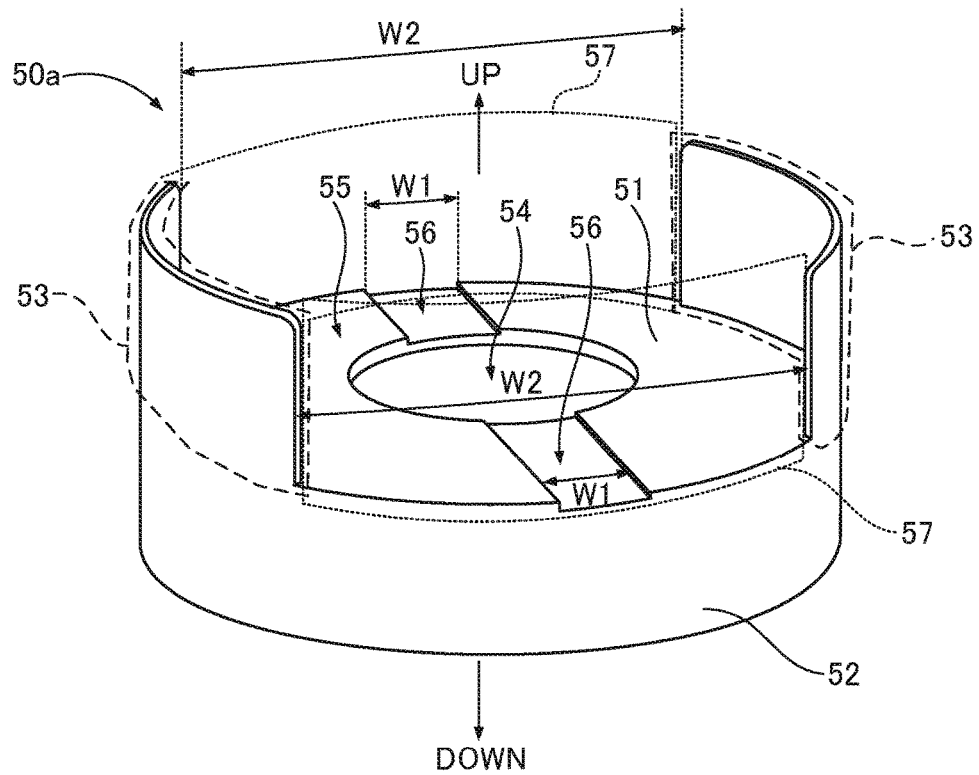
FIG. 4A is a view illustrating a series-coupling component according to a first embodiment.
Figure 4B:
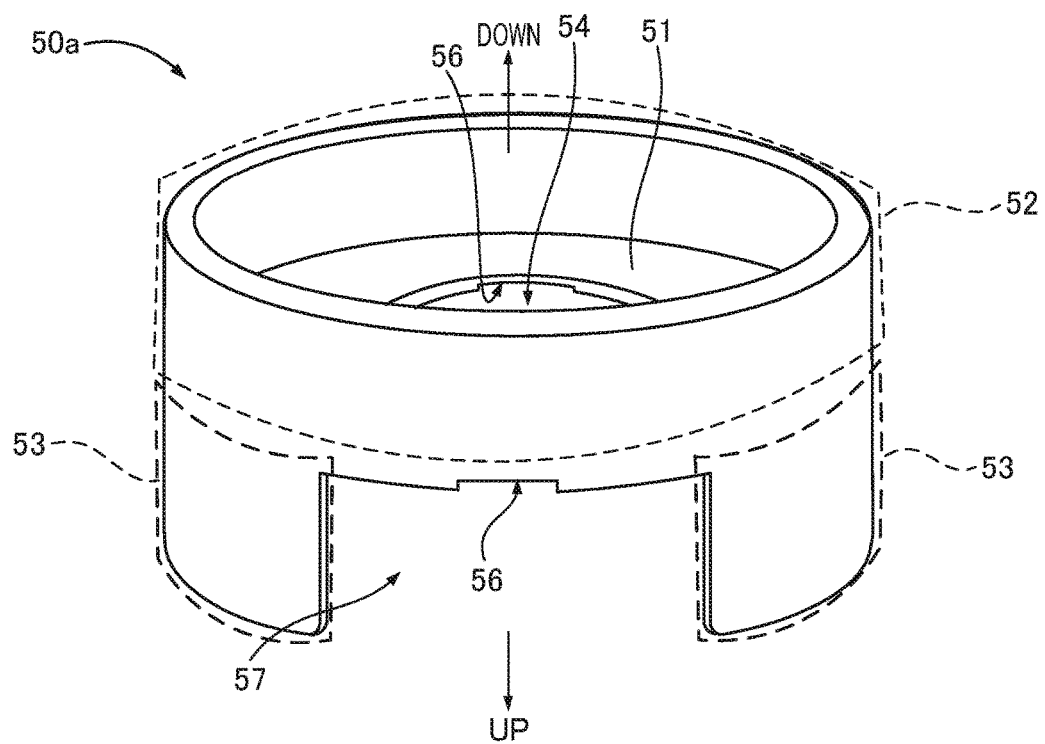
FIG. 4B is a view illustrating the series-coupling component according to the first embodiment.

A series-coupling component according to an embodiment of the present invention is for coupling two cylindrical batteries in a coaxial state. FIG. 4A and FIG. 4B are views illustrating the series-coupling component (hereinafter referred to as a coupling component 50a) according to a first embodiment of the present invention. Based on the preceding specified up and down direction, FIG. 4A is a perspective view when this coupling component 50a is viewed from above, and FIG. 4B is a perspective view when this coupling component 50a is viewed from below. The coupling component 50a illustrated in FIG. 4A and FIG. 4B is a resin integrated molded article, and constituted having a circular plate-shaped bulkhead portion 51, a low profile cylindrically-shaped site (hereinafter referred to as a cylinder portion 52), and a wall surface portion 53. The cylinder portion 52 takes the bulkhead portion 51 as a top surface to open downward. The wall surface portion 53 is erected upwardly from a peripheral area of the bulkhead portion 52.

At the center of the bulkhead portion 51, a hole (hereinafter referred to as a center hole 54) that communicates in the up and down direction is formed. Further, the circular plate-shaped bulkhead portion 51 has an upper surface 55 on which a groove 56 having a rectangular cross-section is formed so as to cross the bulkhead portion 51 in a diameter direction. Then, this groove 56 is released at a peripheral edge of the bulkhead portion 51. That is, on the wall surface portion 53, a cutout portion 57 for releasing the groove 56 at the peripheral edge of the bulkhead portion 51 is formed. In the first embodiment, the wall surface portions 53 are formed at two positions so as to be symmetrical about an extending direction of the groove 56, and the cutout portion 57 has a width W2 wider than a width W1 of the groove 56.

Assembling Procedure of Battery Pack Main Body

Figure 5A:
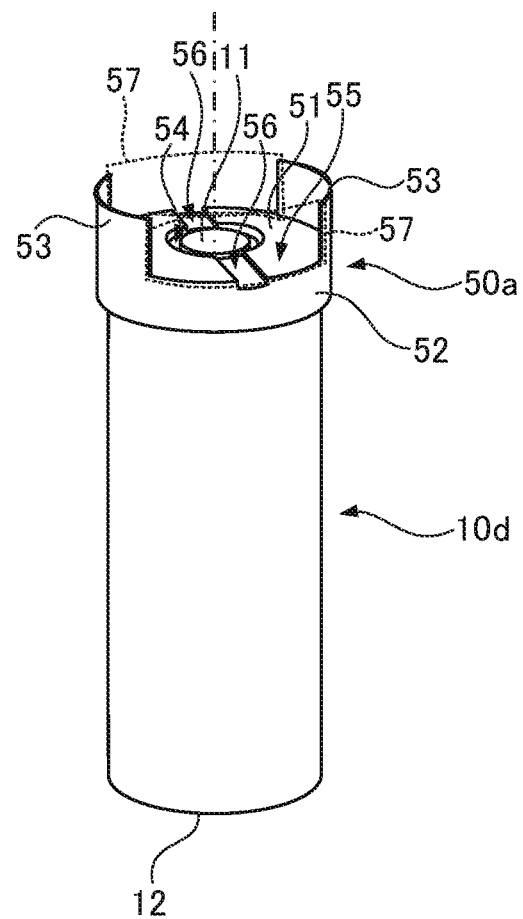
FIG. 5A is a view illustrating one state in a procedure that coaxially disposes two cylindrical batteries to be coupled in series using the above-described series-coupling component according to the first embodiment.

FIG. 5A to FIG. 5D illustrate a procedure that assembles a battery pack main body 1a by coupling two cylindrical batteries (hereinafter referred to as unit batteries (10u, 10d)) in series using the above-described coupling component 50a. First, as illustrated in FIG. 5A, a convex positive electrode terminal 11 side of the lower unit battery 10d is inserted into the cylinder portion 52 of the coupling component 50a. This allows the positive electrode terminal 11 of the unit battery 10d to be inserted into the center hole 54 of the bulkhead portion 51, and a top surface of the positive electrode terminal 11 is exposed to the top surface 55 of the bulkhead portion 51. In the first embodiment, the top surface of the positive electrode terminal 11 and a bottom surface of the groove 56 have approximately identical heights.

Figure 5B:
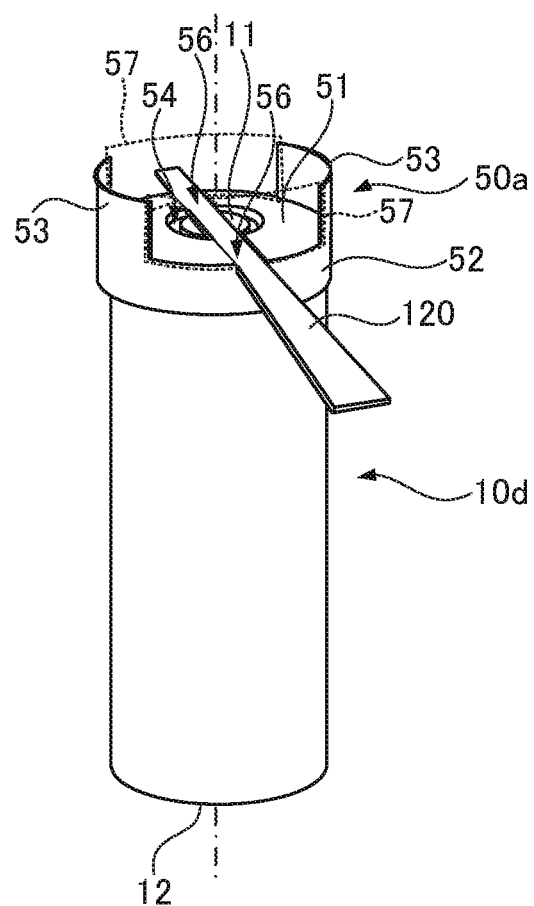
FIG. 5B is a view illustrating one state in the procedure that coaxially disposes the two cylindrical batteries to be coupled in series using the above-described series-coupling component according to the first embodiment.

Here, as illustrated in FIG. 5B, a strip-shaped metal plate 120 that will be finally a tab 20 is disposed inside the groove 56 to cause the top surface of the positive electrode terminal 11 of the lower unit battery 10d to contact one end lower surface of the strip-shaped metal plate 120. Another end of the metal plate 120 is projected outward from the coupling component 50a. Then, the spot welding is performed on an appropriate position in a contact region of the positive electrode terminal 11 and the metal plate 120 to mount the metal plate 120 on the positive electrode terminal 11 of the lower unit battery 10d. Thus, at the coupling component 50a according to the first embodiment, when the strip-shaped metal plate 120 that will be the tab 20 is welded to the positive electrode terminal 11 of the lower unit battery 10d, this metal plate 120 is disposed along the groove 56. Therefore, the metal plate 120 can be accurately guided in a radial direction of the lower unit battery 10d. Since the groove 56 crosses the bulkhead portion 51 to be released at both ends of the diameter of the bulkhead portion 51, in a process that disposes the metal plate 120 inside the groove 56 in the middle of assembling the battery pack main body 1a, a direction guiding this metal plate 120 is not limited to one direction, and thus facilitating this process.

Figure 5C:
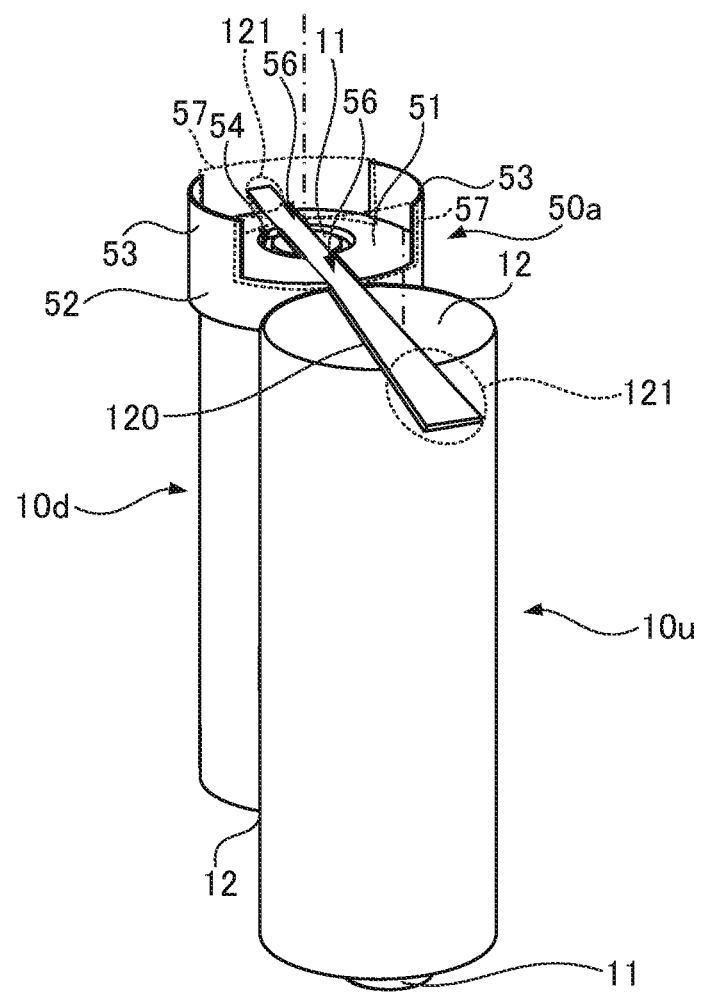
FIG. 5C is a view illustrating one state in the procedure that coaxially disposes the two cylindrical batteries to be coupled in series using the above-described series-coupling component according to the first embodiment.

Next, as illustrated in FIG. 5C, while an end portion lower surface of a site projecting from the coupling component 50a in the metal plate 120 is contacted with a negative electrode terminal 12 of the unit battery 10u that will be finally disposed on the upper side, the spot welding is performed on this contact region. This electrically couples the two unit batteries (10u, 10d) in series.

Figure 3A:
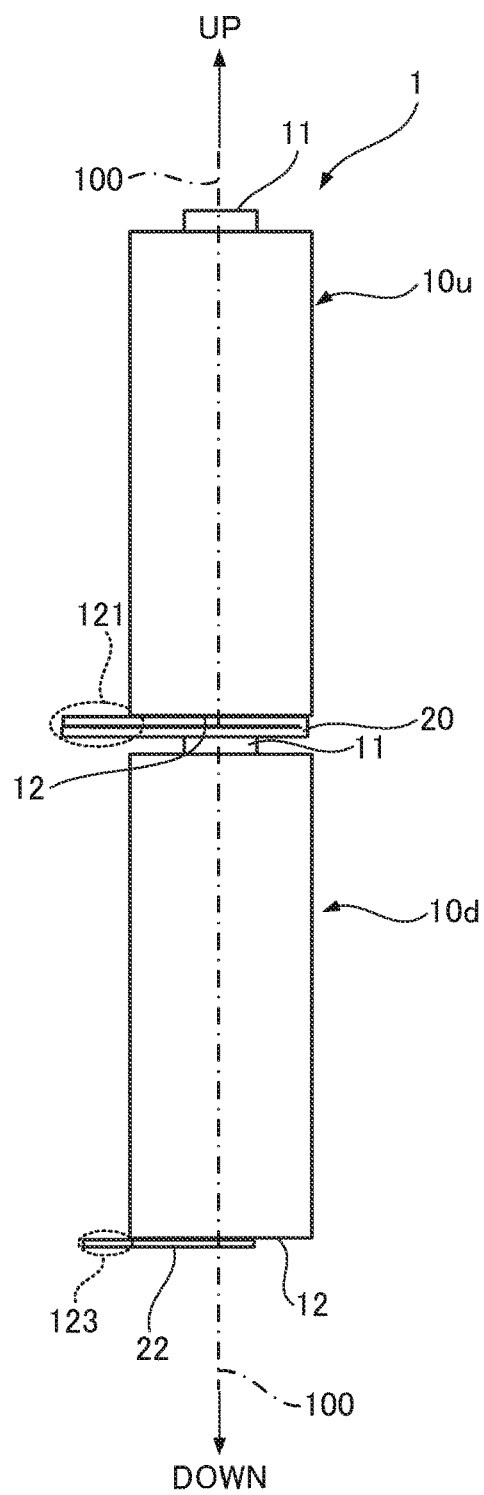
FIG. 3A is a view illustrating one state in a procedure that mounts a safety circuit in the battery pack.
Figure 3B:
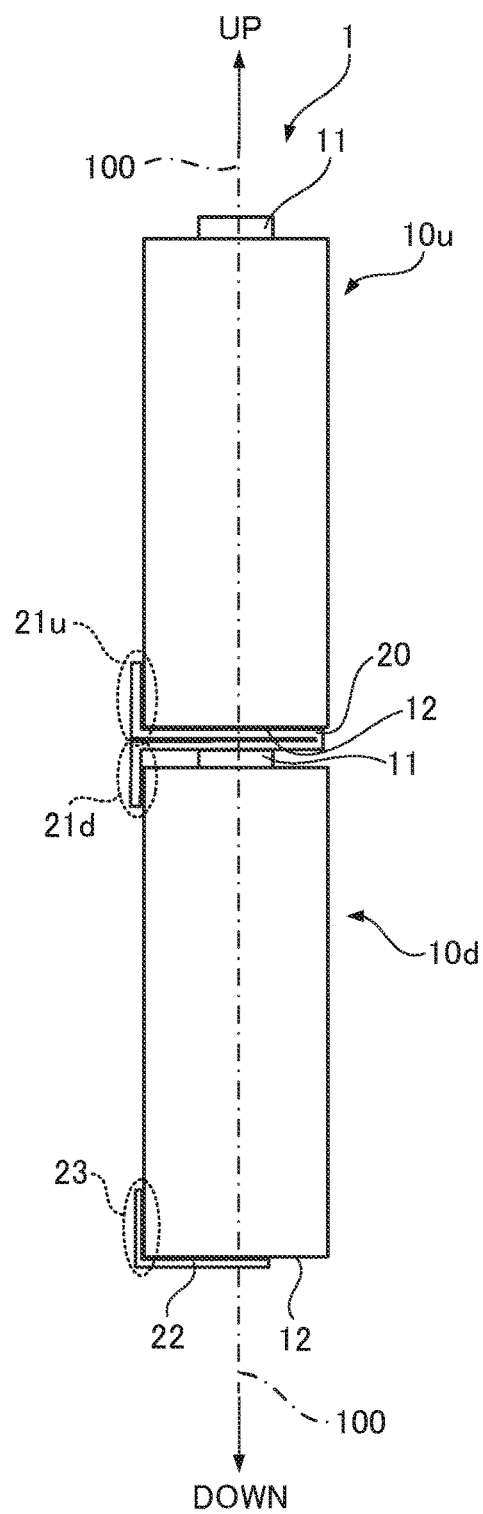
FIG. 3B is a view illustrating one state in the procedure that mounts the safety circuit in the battery pack.
Figure 3C:
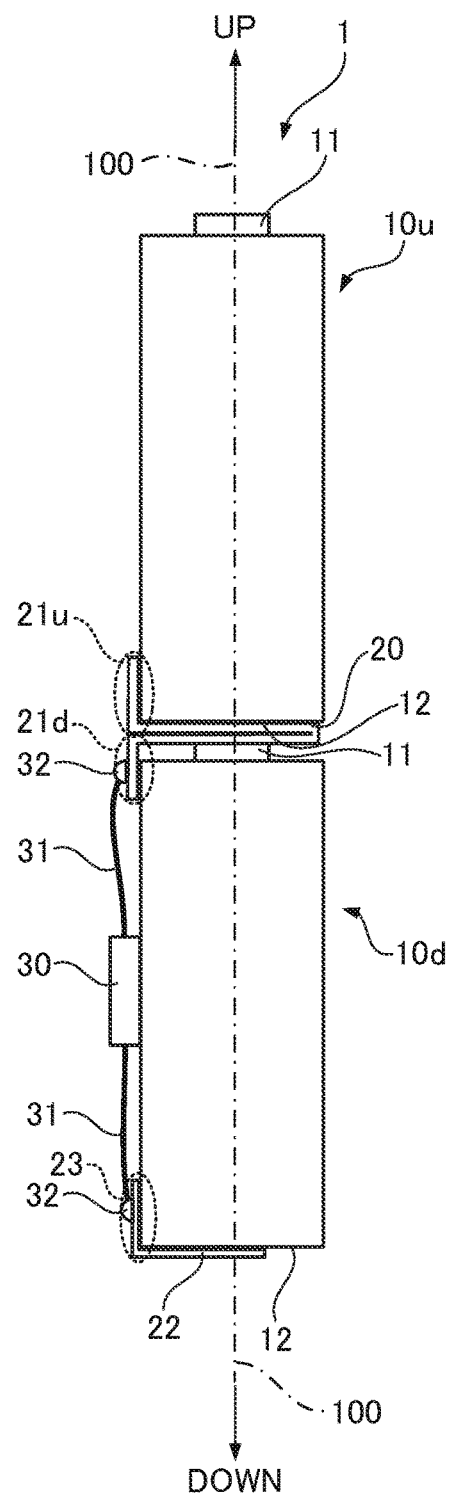
FIG. 3C is a view illustrating one state in the procedure that mounts the safety circuit in the battery pack.
Figure 5D:
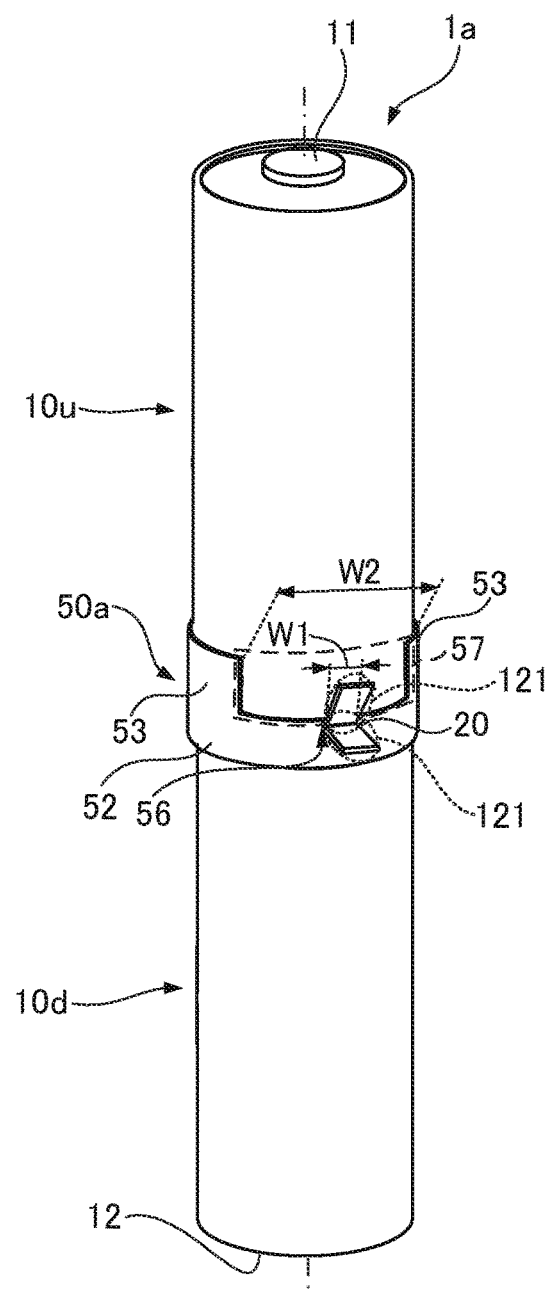
FIG. 5D is a view illustrating one state in the procedure that coaxially disposes the two cylindrical batteries to be coupled in series using the above-described series-coupling component according to the first embodiment.

Thus, when the two unit batteries (10u, 10d) are electrically coupled in series, the metal plate 120 is folded to finally form the tab 20 formed by folding the metal plate 120 in two. In accordance with this, a negative electrode terminal 12 side of the upper unit battery 10u is housed inside the wall surface portions 53 of the coupling component 50a. As illustrated in FIG. 5D, this couples the two unit batteries (10u, 10d) in series to be coaxially disposed, thus completing the battery pack main body 1a. In FIG. 5D, for well understanding a positional relationship between the coupling component 50a and the tab 20, the tab 20 is projected outwardly from the coupling component 50a. Further, FIG. 5D illustrates a process that folds this projecting part 121 as opened in the up and down direction, so that the projecting part 121 does not open a hole in a heat shrinkable tube that is thereafter covered. That is, even though the tab 20 is projected outwardly from the coupling component 50a, if this projecting part 121 is folded to be laid along side surfaces of the unit batteries (10u, 10d) and then the projecting part 121 is covered with the heat shrinkable tube, opening of the hole in the heat shrinkable tube can be surely prevented. Needless to say, if it is not necessary to mount the safety circuit 30 as illustrated in FIG. 3C, it is not necessary to make the tab 20 to project.

Then, at the coupling component 50a according to the first embodiment, since the width W2 of the cutout portion 57 is wider than the width W1 of the groove 56, when the upper and lower unit batteries (10u, 10d) are coaxially disposed while the metal plate 120 is folded, a lower end side of the upper unit battery 10u is smoothly housed between the two wall surface portions 53. Then, in the battery pack main body 1a using the coupling component 50a according to the first embodiment, the upper and lower unit batteries (10u, 10d) are held by the wall surface portions 53 and the cylinder portion 52 of the coupling component 50a. Accordingly, in the battery pack where the battery pack main body 1a is covered with the heat shrinkable tube, the outer shape does not easily deform.

Mounting of Safety Circuit

Figure 6:
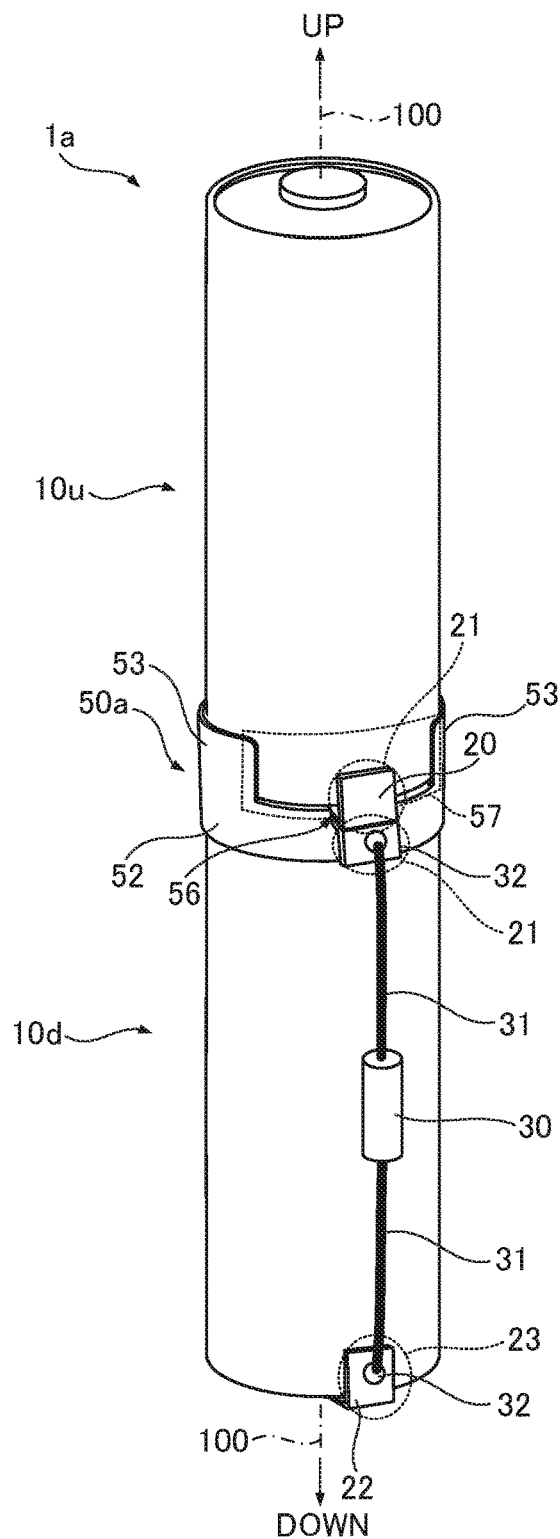
FIG. 6 is a view illustrating a state that mounts the safety circuit on the unit batteries coupled in series using the above-described series-coupling component according to the first embodiment.

When the safety circuit 30 is mounted on the battery pack main body 1a, the above-described projecting part 121 will be disposed at the tab 20. At the coupling component 50a according to the first embodiment, the external short circuit can be surely prevented when this safety circuit 30 is mounted. Specifically, as illustrated in FIG. 6, the part projecting outwardly from the coupling component 50a in the tab 20 (reference numeral 121 in FIG. 5D) is bended to open in the up and down direction, thus laying the part along the side surfaces of the upper and lower unit batteries (10u, 10d). A terminal plate 22 mounted on the negative electrode terminal 12 of the lower unit battery 10d has an distal end side bended on the upper side to be an L shape, thus laying the distal end side along the side surface of the lower unit battery 10d. Then, ends of lead terminals 31 of the safety circuit 30 such as a diode are mounted on the tab 20 and the terminal plate 22 by solder 32. Accordingly, bend parts 21 that are soldered at the tab 20 are disposed along a side surface of the cylinder portion 52 of the coupling component 50a made of resin. Thus, the folded tab 20 does not damage the insulating exterior body of the unit battery 10d. Heat when the lead terminal 31 of the safety circuit 30 is soldered to the tab 20 becomes less likely to transmit to the exterior body. Thus, the hole is not opened in the exterior body. That is, the tab 20 mounted on the positive electrode terminal 11 of the lower unit battery 10d does not electrically contact a battery can that doubles as a negative electrode current collector of the identical unit battery 10d. This can surely prevent the external short circuit of the battery pack main body 1a.

Second Embodiment

Figure 7A:
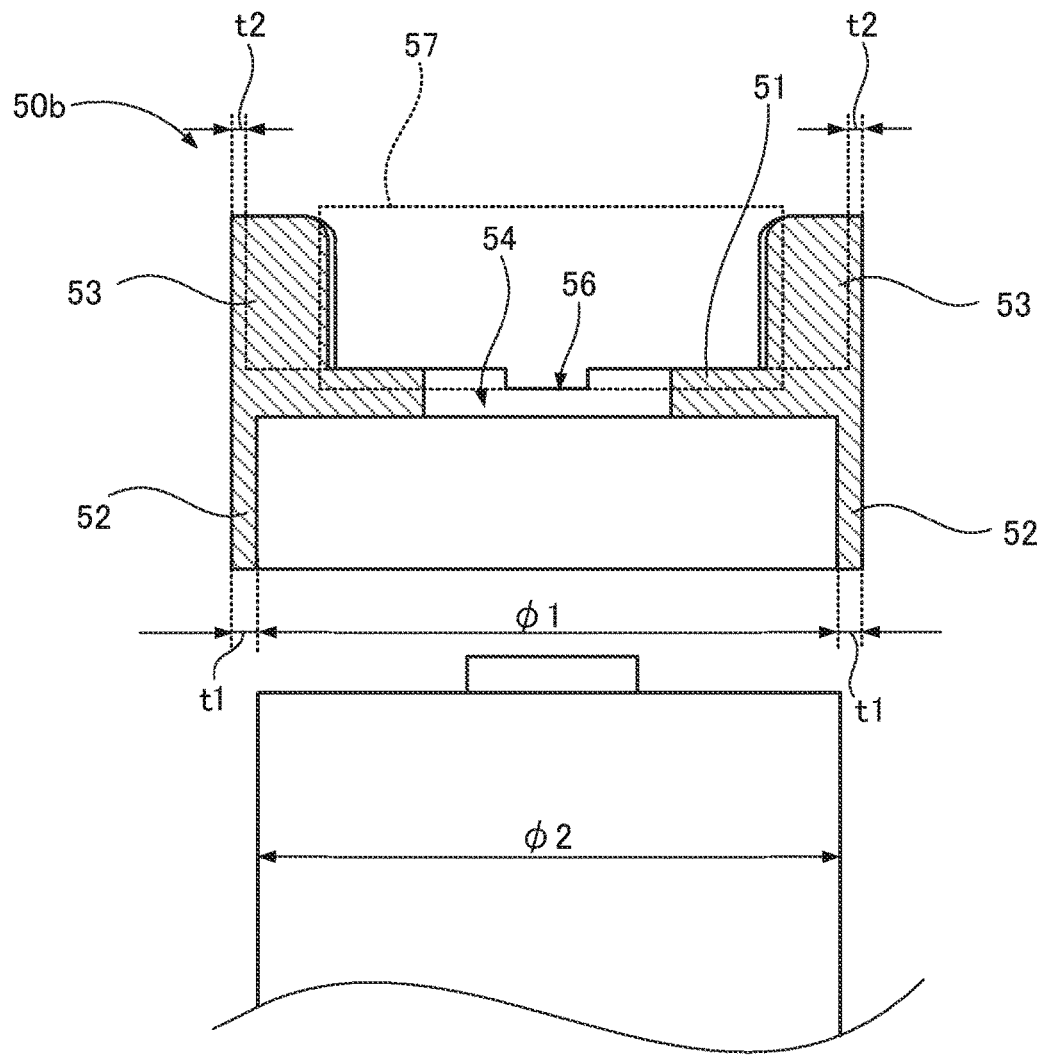
FIG. 7A is a view illustrating a series-coupling component according to a second embodiment.
Figure 7B:
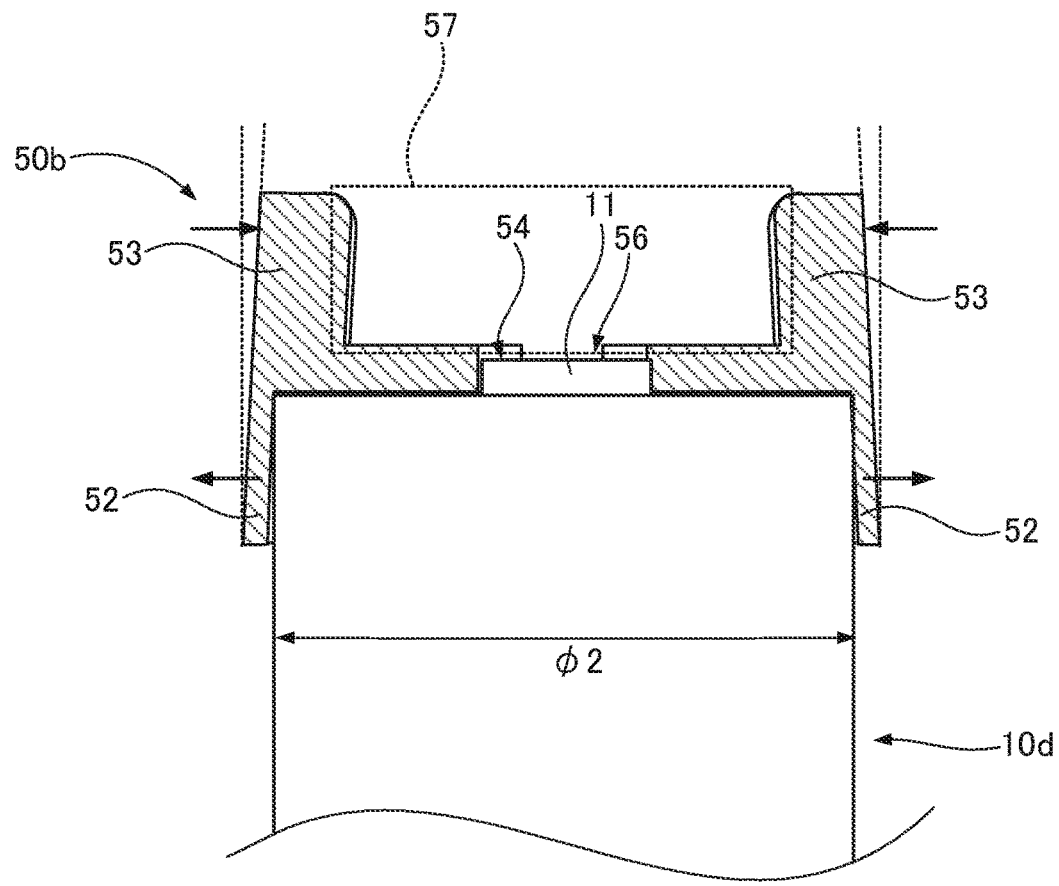
FIG. 7B is a view illustrating the series-coupling component according to the second embodiment.

The coupling component 50a according to the first embodiment holds the coaxially disposed two unit batteries (10u, 10d) by the cylinder portion 52 and the wall surface portions 53. Therefore, especially in a case where an external force in the radial direction is applied to the unit batteries (10u, 10d), the outer shape as the battery pack can be strongly maintained. However, when the metal plate 120 that constitutes the tab 20 is thin, if a force that attempts to separate the two unit batteries (10u, 10d) in the up and down direction is applied to the two unit batteries (10u, 10d), the outer shape as the battery pack possibly slightly changes. Therefore, as a second embodiment of the present invention, a coupling component that can more strongly maintain the outer shape of the coaxially disposed two unit batteries (10u, 10d) also with respect to the force in the up and down direction is presented. FIG. 7A and FIG. 7B are views for describing outer shape maintaining action of a battery pack in a coupling component 50b according to the second embodiment. FIG. 7A illustrates a state before the lower battery 10d is inserted into the coupling component 50b according to the second embodiment. FIG. 7B illustrates a state when the lower battery 10d has been inserted into this coupling component 50b. FIG. 7A and FIG. 7B illustrate vertical cross-sectional views when the coupling component 50b according to the second embodiment is cut off at a surface including the up and down direction.

As illustrated in FIG. 7A, a wall thickness t1 of the side surface of the cylinder portion 52 is thicker than a wall thickness t2 of the wall surface portion 53, and the cylinder portion 52 has an inner diameter φ1 smaller than an outer diameter φ2 of each of the unit batteries (10u, 10d). The inner diameter φ1 of the cylinder portion 52 has a certain size into which the lower unit battery 10d can be pressed, and is appropriately configured corresponding to, for example, an elastic modulus of a resin material that constitutes the coupling component 50b.

Then, when the positive electrode terminal 11 side of the lower unit battery 10d is inserted into the cylinder portion 52 of this coupling component 50b, as illustrated in FIG. 7B, the inner diameter φ1 of the cylinder portion 52 is distorted in a direction radially expanding according to the outer diameter φ2 of the unit battery 10d. As a result, stress in a direction inclining inward is applied to the wall surface portions 53 erected upwardly via the bulkhead portion 51. Accordingly, the negative electrode terminal 12 side of the upper unit battery 10u is also strongly sandwiched by the wall surface portions 53. Both of the upper and lower unit batteries (10u, 10d) are fitted into the coupling component 50b, thus ensuring the maintenance of the outer shape more strongly with respect to the force in the up and down direction.

Other Embodiments

Figure 8A:
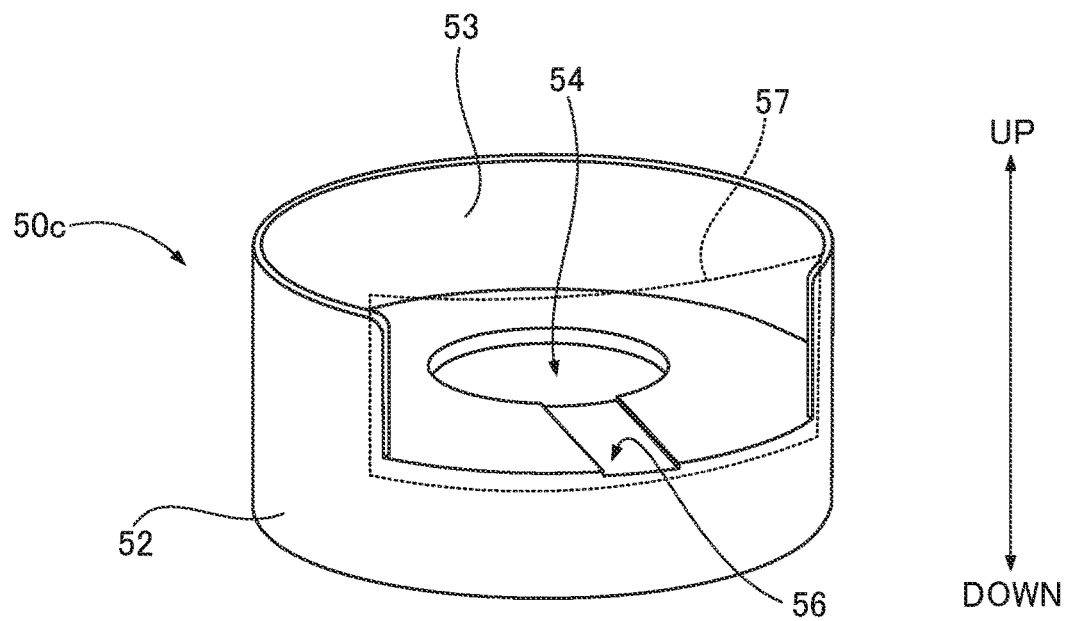
FIG. 8A is a view illustrating a series-coupling component according to various modifications.
Figure 8B:
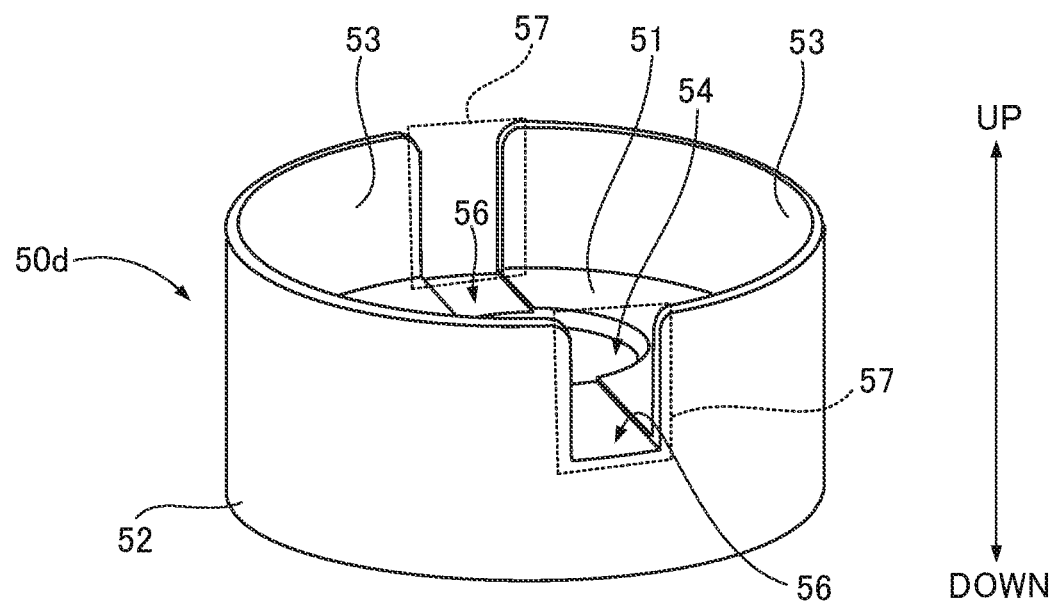
FIG. 8B is a view illustrating a series-coupling component according to various modifications.
Figure 8C:
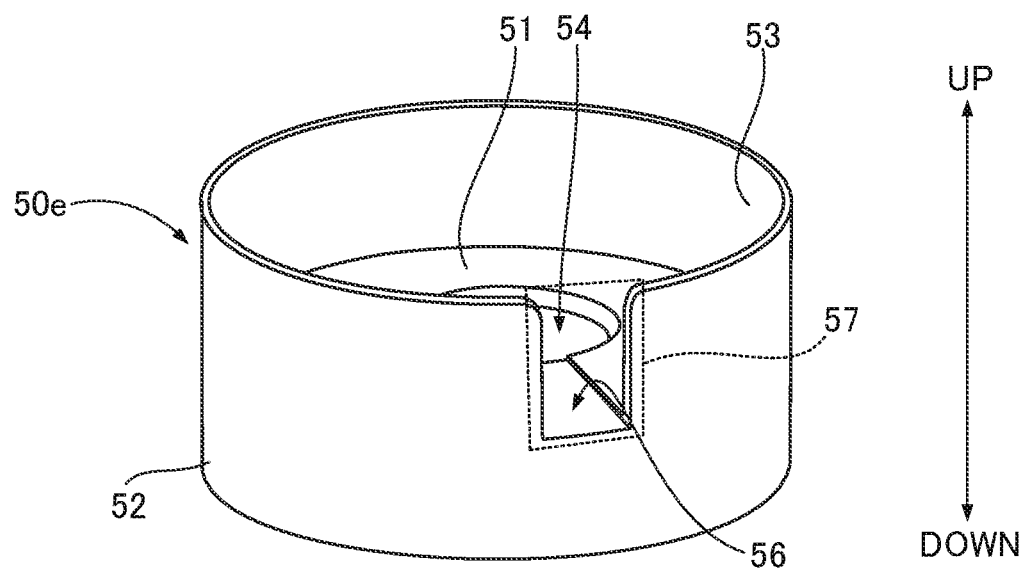
FIG. 8C is a view illustrating a series-coupling component according to various modifications.
Figure 9:
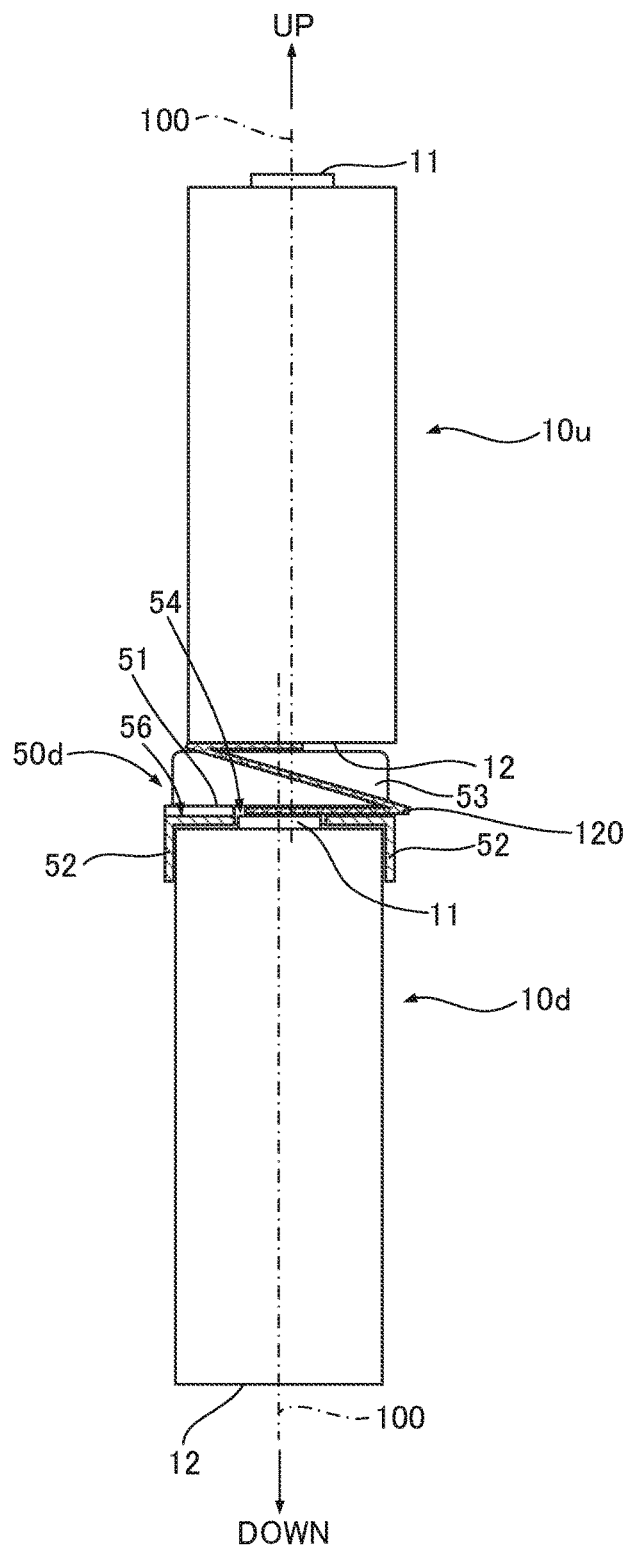
FIG. 9 is a view illustrating a state that coaxially disposes two unit batteries to be coupled in series using one of the above-described series-coupling components according to the modifications.

The coupling component according to the embodiment of the present invention is not limited to the above-described first and second embodiments, and includes various modifications. FIG. 8A to FIG. 8C illustrate coupling components according to the modifications. A coupling component 50c illustrated in FIG. 8A has one wall surface portion 53, and the groove 56 that does not cross the bulkhead portion 51 and is released only at one position at an edge of the bulkhead portion 51 taking the center hole 54 as a starting point. Then, the cutout portion 57 is formed at an opening part of this groove 56. In a coupling component 50d illustrated in FIG. 8B, the cutout portion 57 has a width that matches a width of the groove 56. Also in this case, as a coupling component 50e illustrated in FIG. 8C, only one wall surface portion 53 may be formed. As the coupling components (50d, 50e) illustrated in FIG. 8B and FIG. 8C, when the width of the cutout portion 57 is narrow, and when the resin that constitutes the coupling components (50d, 50e) does not have sufficient elasticity, it is sometimes difficult to smoothly house the negative electrode terminal 12 side of the upper unit battery 10u in an inward of the wall surface portion 53. Therefore, when the width of the cutout portion 57 is narrow, it is only necessary not to form the tab 20 by folding the metal plate 120 in two, but to form the tab 20 by folding the metal plate 120 in zigzag. Specifically, FIG. 9 illustrates an example that coaxially disposes the two unit batteries (10u, 10d) to be coupled in series using the coupling component 50d illustrated in FIG. 8B. FIG. 9 illustrates the coupling component 50d as a vertical cross-sectional view including the extending direction of the groove 56. Then, as illustrated in FIG. 9, when the tab is formed so as to fold the strip-shaped metal plate 120 in zigzag, the upper unit battery 10u moves downward approximately coaxially with the lower unit battery 10d, and finally, the upper unit battery 10u is disposed coaxially with the lower unit battery 10d to be housed in the inward of the wall surface portion 53.

The coupling component according to the embodiment of the present invention is interposed in unit battery cans coaxially disposed in the up and down direction. Accordingly, the battery pack can be constituted by coaxially disposing three or more unit batteries to be coupled in series. Needless to say, the battery pack may be constituted by taking two cylindrical batteries coupled in series using the coupling component as one set and arranging a plurality of the sets in parallel. In any case, it is only necessary to interpose the coupling component of the present invention at a coupling position of the unit batteries that are to be coaxially disposed and coupled in series.

REFERENCE SIGNS LIST 1a, 1b battery pack main body
10u, 10d cylindrical battery (unit battery)
11 positive electrode terminal
12 negative electrode terminal
20 tab
30 safety circuit (diode)
50a to 50e series-coupling component (coupling component)
51 bulkhead portion
52 cylinder portion
53 wall surface portion
54 center hole
56 groove
57 cutout portion
100 cylindrical axis of unit battery
120 metal plate

The invention claimed is:
1. A series-coupling component for a battery pack, in a battery pack taking a cylindrical battery as a unit battery, the cylindrical battery including one convex electrode terminal at an upper end surface and another electrode terminal at a lower end surface, the coupling component being for holding two of the unit batteries coupled in series via a tab formed by folding a strip-shaped metal plate in a state where the two of the unit batteries are coaxially disposed,
   the coupling component being constituted of an integrated molded article made of resin,
   the coupling component comprising:
      a circular plate-shaped bulkhead portion;
      a cylinder portion taking the bulkhead portion as a top surface and opening downward, an upper end side of the unit battery being inserted into the cylinder portion; and
      a wall surface portion erected upwardly along a peripheral edge of the bulkhead portion to hold a lower end side of the unit battery,
   the wall surface portion being separated by a cutout portion from an upper end of a cylindrical side surface up to a top surface of the bulkhead portion at a part of the cylindrical side surface that opens at the upper side taking the bulkhead portion as a bottom, the bulkhead portion including a hole that communicates in an up and down direction at a center, and a groove having a rectangular cross-section on a top surface, the convex electrode terminal being inserted into the hole, the tab being housed in the groove, the groove extending in a radial direction of the circular plate-shaped bulkhead portion to open at peripheral edges of the hole and the bulkhead portion, the cutout portion being formed in a region that opens the groove at the peripheral edge of the bulkhead portion.

2. The series-coupling component for a battery pack according to claim 1, wherein a width of the cutout portion in a circumferential direction of the bulkhead portion is wider than a width of the groove.

3. The series-coupling component for a battery pack according to claim 1, wherein the groove crosses the bulkhead portion in a diameter direction to open at both ends of the diameter.

4. The series-coupling component for a battery pack according to claim 1, wherein the cylinder portion has an inner diameter smaller than an outer periphery of the unit battery, and the upper end side of the unit battery is pressed into an inside of the cylinder portion.

5. A battery pack integrally formed in a manner that a plurality of unit batteries coupled one another is covered with a heat shrinkable tube, wherein the unit battery is a cylindrical battery including one convex electrode terminal at an upper end surface and another electrode terminal at a lower end surface, the plurality of unit batteries includes two unit batteries coaxially disposed in an up and down direction via the series-coupling component according to any one of claims 1 to 4 and coupled in series via a tab, in the two unit batteries, the lower unit battery has an upper end side inserted into the cylinder portion of the series-coupling component, the convex electrode terminal is inserted into the hole, and the upper unit battery has a lower end side held by the wall surface portion, the tab formed by folding a strip-shaped metal plate is disposed along the groove, and the tab has a lower surface mounted on an upper surface of the convex electrode terminal exposed at the upper side via the hole, and an upper surface mounted on an electrode terminal on a lower end surface of the upper unit battery.

6. The battery pack according to claim 5, wherein the unit battery includes a battery can that doubles as a current collector of one electrode, the tab projects outwardly from the peripheral edge of the bulkhead portion, the projecting region bending along a side surface of the cylinder portion, a safety circuit is coupled to between both positive and negative electrodes of the unit battery where the tab is mounted on an electrode terminal of an electrode different from an electrode of the battery can, among the two unit batteries, one lead terminal guided from the safety circuit is soldered to the projecting region of the tab, and the safety circuit and the plurality of unit batteries are covered with the heat shrinkable tube.

* * * * *